(12) United States Patent
Morton

(10) Patent No.: US 7,130,386 B2
(45) Date of Patent: Oct. 31, 2006

(54) SYSTEM FOR PROVIDING COMMERCIAL ADVERTISING TO A TELEPHONE USER ON HOLD

(75) Inventor: Edward Morton, Oswego, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 304 days.

(21) Appl. No.: 10/434,577

(22) Filed: May 9, 2003

(65) Prior Publication Data
US 2004/0223597 A1 Nov. 11, 2004

(51) Int. Cl.
*H04M 1/64* (2006.01)
(52) U.S. Cl. .................. 379/76; 379/114.13; 709/231
(58) Field of Classification Search .................. 379/76, 379/77, 212.01, 393
See application file for complete search history.

(56) References Cited

U.S. PATENT DOCUMENTS 4,850,007 A * 7/1989 Marino et al. ......... 379/114.13
5,875,231 A * 2/1999 Farfan et al. ............... 379/67.1

* cited by examiner

*Primary Examiner*—Gerald Gauthier

(57) ABSTRACT

A method and apparatus for providing information to a telecommunications customer who has been placed in the hold state by a telecommunications network providing a call connection to said customer. The information may be in the form of an advertisement in which case the carrier can derive revenue from providing the service. The information can be selected based on the customer profile so that the most appropriate advertisement is transmitted to the customer who is on hold.

19 Claims, 6 Drawing Sheets

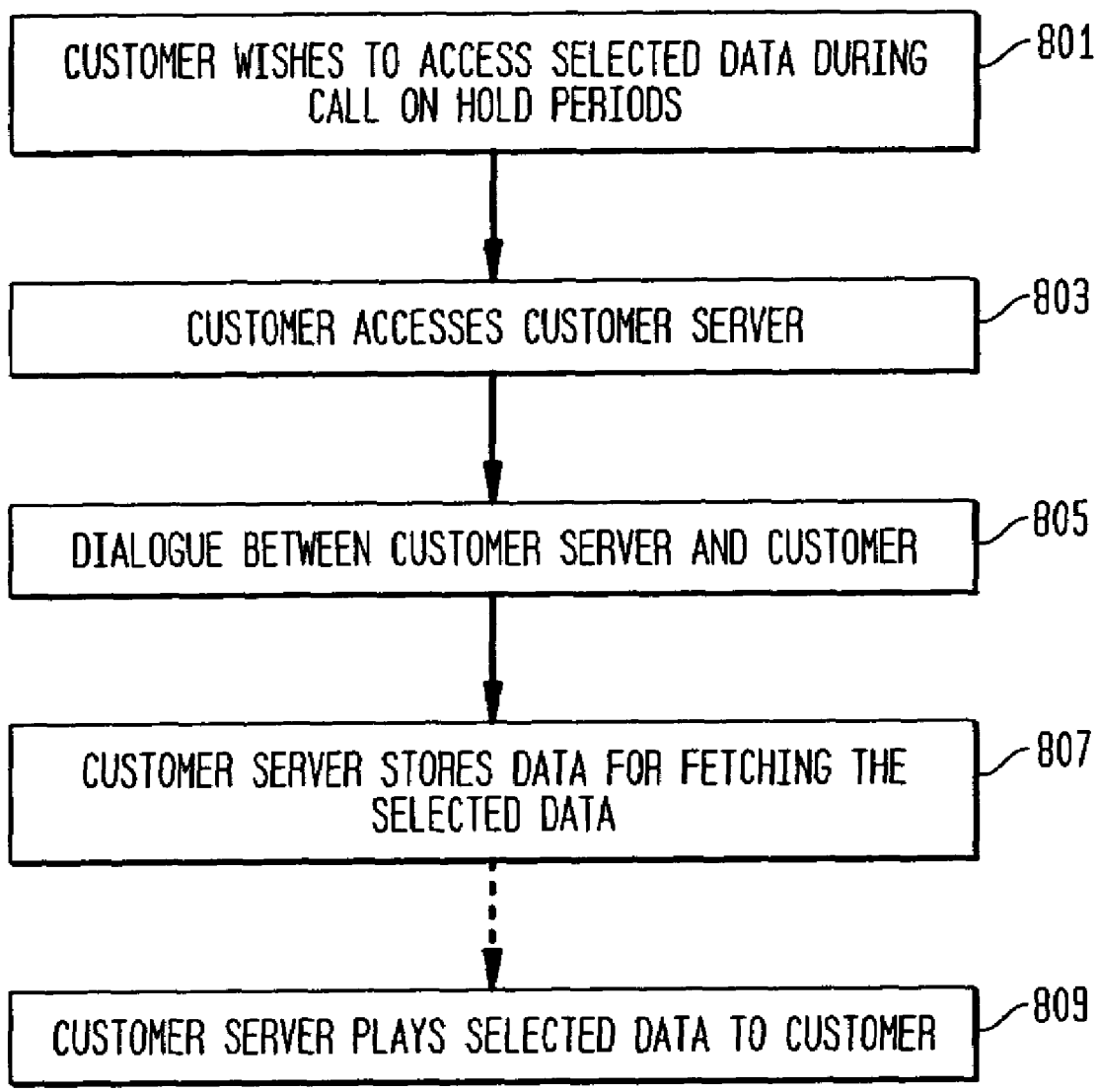

SYSTEM FOR PROVIDING COMMERCIAL ADVERTISING TO A TELEPHONE USER ON HOLD

RELATED APPLICATION

This Application is related to an Application entitled "A System For Providing Commercial Advertising To A Telephone User," by the inventor of this Application, being filed concurrently herewith and assigned to the assignee of this Application.

TECHNICAL FIELD

This invention relates to a system and apparatus for providing commercial advertisements to a telephone user on hold.

BACKGROUND OF THE INVENTION

There are many sources of information provided to a telephone user in addition to the telephone communication. Examples include signals such as dial tone (signifying that the user may start dialing); busy tone indicating that the called party is busy; fast busy indicating that the network is overloaded and that the call cannot be completed at this time; call waiting tone indicating that another party is trying to reach the party to which the call waiting tone is applied; and announcements such as the fact that the called party telephone number is no longer in service. These types of signals have been enhanced in recent years by signals such as the calling party identification displayed to a called telephone customer; and announcements that the caller may automatically notify the called party of his/her number in case the called party does not answer a call. Special audible logos are frequently applied to a call to identify the carrier of the call. U.S. Pat. No. 5,608,788 describes arrangements for transmitting information such as an identification of the called party and providing further information useful to the caller from the called party. U.S. Pat. No. 4,953,204 discloses arrangements in the telephone switching network for allowing a caller to select the music on hold to be provided while the caller is waiting for an answer from a busy automatic call distributor network.

SUMMARY OF THE INVENTION

Applicant has analyzed all of these types of signals and announcements provided through the telephone network and has recognized a problem or, more properly stated, a missed opportunity. None of these arrangements provide facilities for returning to a caller on hold or a called party on hold an advertisement from a third party which is neither the caller nor the called party nor the telecommunications carrier handling the call. In accordance with Applicant's invention, announcement facilities are provided to transmit an advertisement to a caller on hold or a called party on hold. Advantageously, such an arrangement can be a source of substantial additional revenue to a telecommunications common carrier.

In accordance with one feature of Applicant's invention, the advertisement is selected so that the most profitable type of advertisement can be provided, based on the identity of the recipient of the advertisement. For example, data can be stored for each customer or a group of customers to help direct the selection of the advertisement. The advertisement can be selected according to the location of the customer. Other advertisements, for example for TV shows, can be selected by time of day and/or day of week. Alternatively, the advertisement can be selected without regard to the customer.

In accordance with another feature of Applicant's invention, the length of the message is measured and recorded so that an appropriate bill can be provided to the advertiser.

BRIEF DESCRIPTION OF THE DRAWING(S)

FIG. 8 is a flow diagram illustrating how a customer can control the reception of selected data during hold intervals.

DETAILED DESCRIPTION

Figure 1:
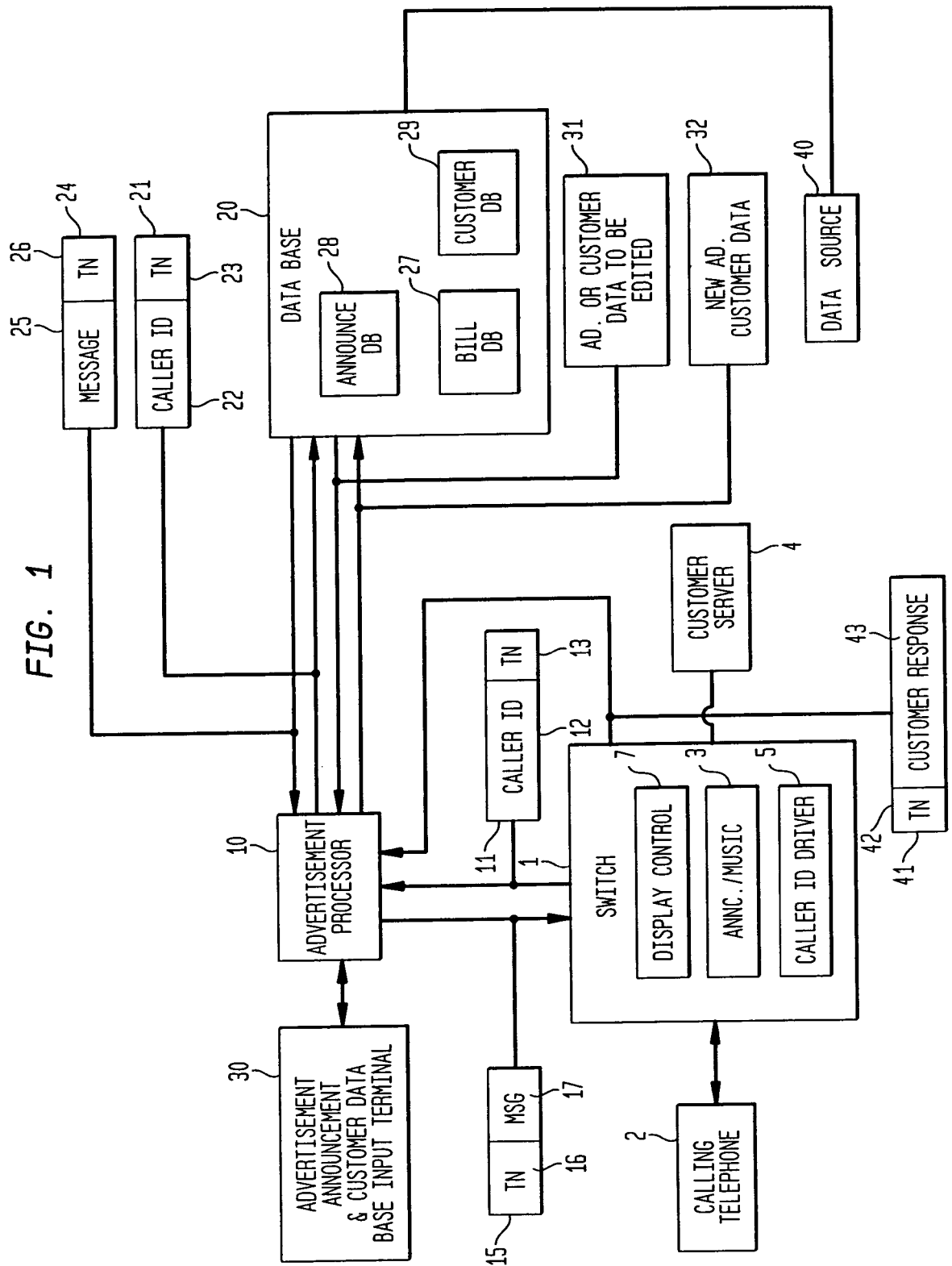
FIG. 1 is a block diagram illustrating the operation of Applicant's invention.

FIG. 1 is a block diagram illustrating the operation of Applicant's invention. A calling telephone 2 is being served by a switch 1. The switch 1 accesses an advertisement processor 10 when the opportunity to play an announcement is recognized, i.e., when either party on a connection is placed on hold. Switch 1 sends a message 11 containing a held party identification 12 (in general, the held party's telephone number or billing number) and a transaction number 13, to an advertisement processor 10. The advertisement processor 10 accesses database 20. Database 20 consults its customer database 29 and based on the information received from that customer database selects an announcement from its announcement database 28. The announcement is returned in a message 24 to the advertisement processor. Message 24 includes the announcement message 25 derived from the announcement database and the transaction number 26 to identify the transaction. The advertisement processor then returns message 15 containing the transaction number 16 and the announcement message 17 to the switch connected to the party on hold. The switch uses the transaction number to identify the call on which the message should be announced.

The overall system also includes one or more advertisement announcement and customer database generating terminals 30 which can access the advertisement processor. When an announcement is to be edited, added or deleted or the customer database is to be modified to steer different kinds of announcements to a caller with a particular telephone number, then the terminal 30 accesses advertisement processor 10 which in turn accesses the database 20. It accesses the database 20 with message 31 requesting the advertisement or customer data to be edited and responds with message 32 containing the new advertisement or customer data. The customer data can be based on many commercial databases which identify the particular kinds of advertisements that are most appropriate (music events, CDs, sports events, sports equipment, financial information computer equipment) for a particular telephone customer.

The switch contains announcement/music play equipment 3, customer display control 7 for driving customer displays, and caller ID driver 5 for communicating to the customer.

The database 20 also contains a billing database to accumulate records for which advertisement or advertisements from a particular source were played for which customers so that the advertisers can be appropriately billed.

A customer server 4 is also connected to the switch 1. This server can be used, for example, to record memos to be provided to the caller when the caller makes his/her next call, or upon request from the caller.

Figure 2:
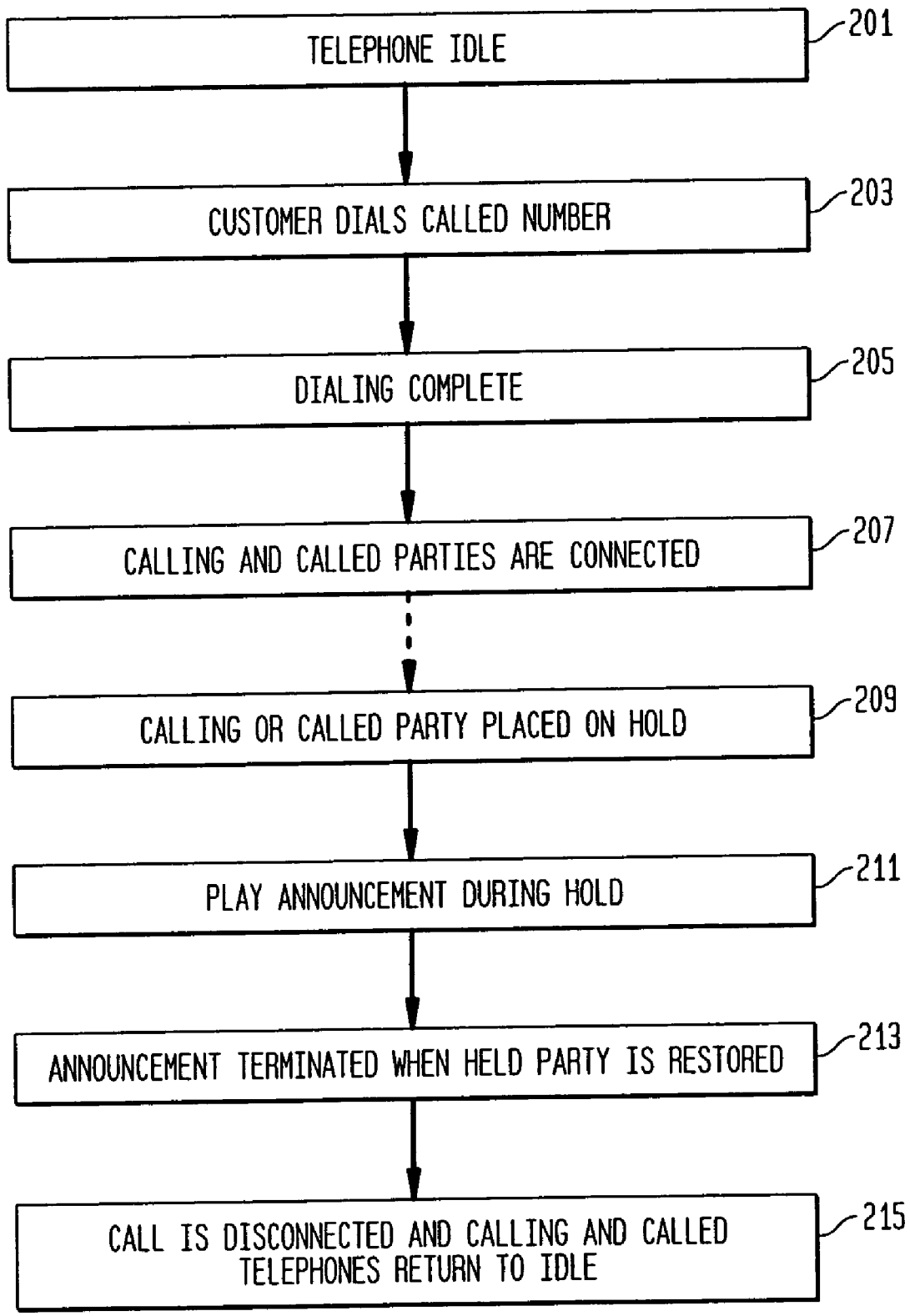
FIG. 2 is a flow diagram illustrating when announcements can be played to a telephone customer.

FIG. 2 is a flow diagram of a typical call. The initial state is idle (action block 201). The calling customer then picks up the handset and dials the called number (action block 203). After dialing is complete (action block 205) (for a cellular call, this is after the "send" button has been pressed), the calling and called parties are connected (action block 207)

If during the course of the call a party is placed on hold (action block 209) then an announcement can be played during the hold interval to the held party (action block 211). The hold announcement can be played to either the originating or the terminating customer, whichever one is placed on hold.

When the party on hold is restored to the connection, the announcement is terminated (action block 213). Eventually, the call is disconnected and the calling and called telephones revert to idle (action block 215).

While the above description has been for an ordinary analog telephone, telephones equipped with displays (including calling line identification displays) can have announcement type information visually displayed.

Figure 3:
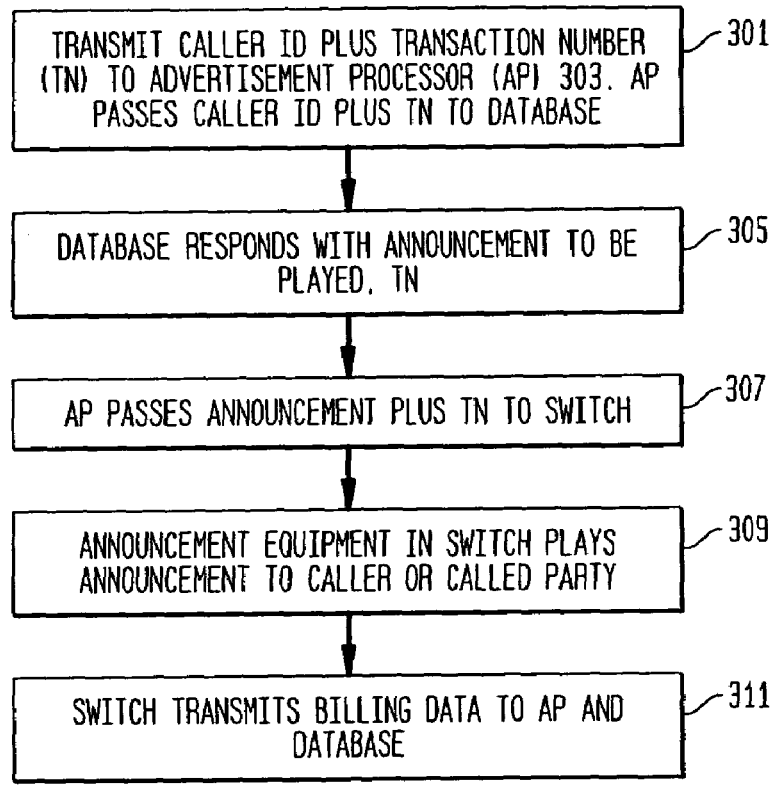
FIG. 3 is a flow diagram illustrating the process of playing an announcement.

FIG. 3 is a flow diagram illustrating the process of playing an announcement. The caller identification and a transaction number is passed from the switch to an advertisement processor (action block 301). While in this description the advertisement processor is shown as a separate unit, in alternative embodiments the advertisement processor is simply a logical sub-entity of the switch and its control processor.

The advertisement processor passes the caller identification and the transaction number to the database 20 (action block 303). The database responds with the announcement message to be played and the transaction number (action block 305). The advertisement processor 10 passes the message and the transaction number to the switch (action block 307). The announcement equipment 3 in the switch plays the announcement to the caller (action block 309). In the case of an announcement being provided to a call on hold, this may be provided to a called party. The switch measures the length of the announcement and passes billing information to the advertisement processor and database (action block 311). The switch returning the announcement can be the switch serving the called party if that party goes on hold.

Figure 4:
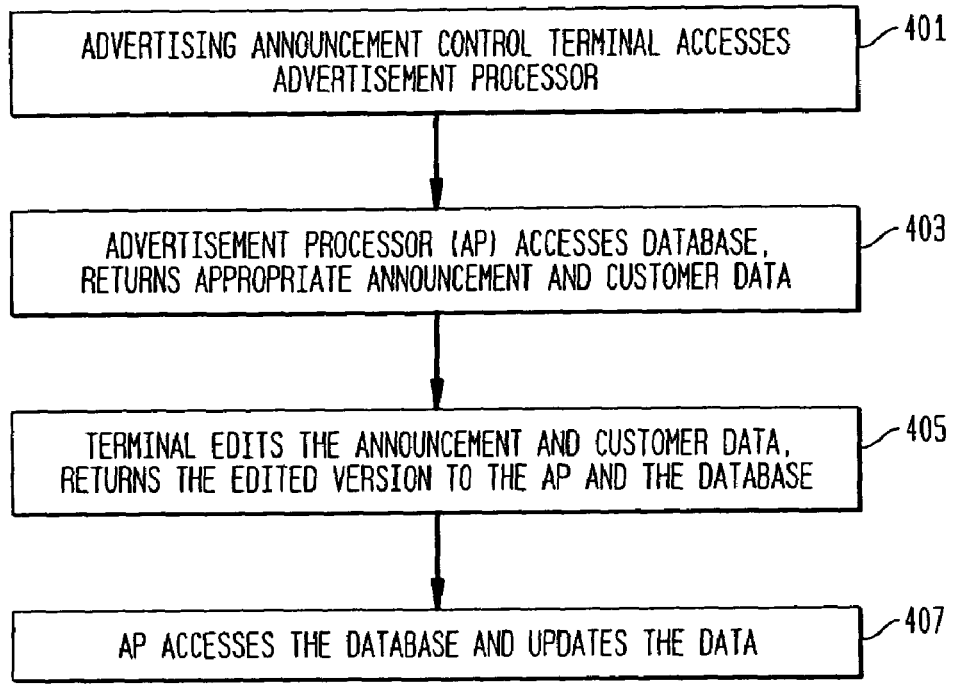
FIG. 4 is a flow diagram illustrating the process of editing the announcement and customer database.

FIG. 4 is a flow diagram illustrating the process of editing the announcement and customer database. An advertising announcement control terminal accesses the advertisement processor (action block 401). The advertisement processor accesses the database and returns the appropriate announcement and customer data (action block 403). The terminal edits the announcement and customer data and returns the edited version to the advertisement processor (action block 405). The advertisement processor then updates the database (action block 407).

Figure 5:
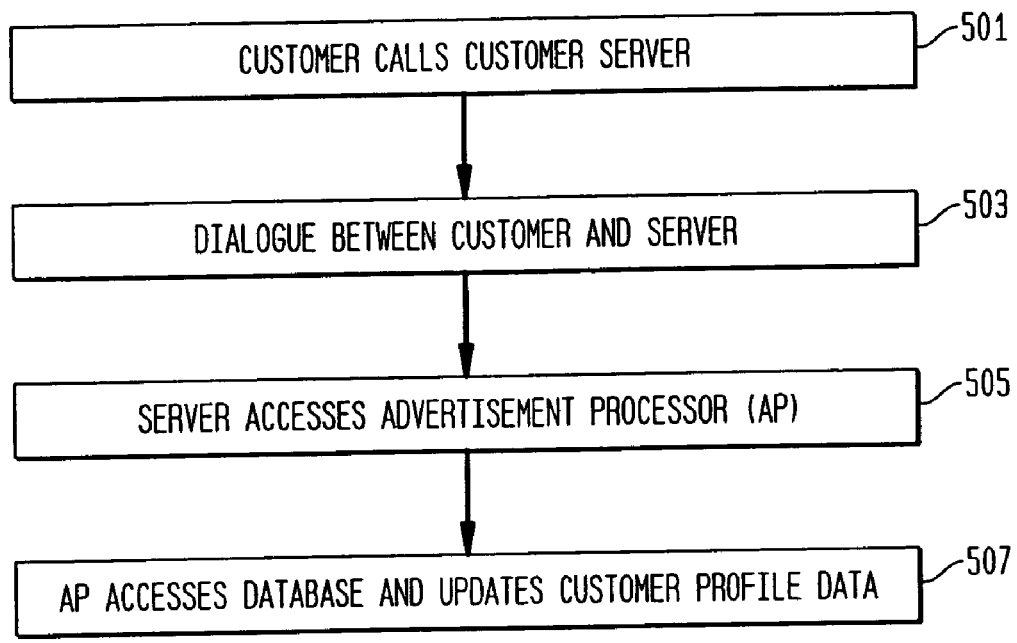
FIG. 5 is a flow diagram illustrating the editing of a customer database.

FIG. 5 illustrates the process of accepting customer requests for type of advertising or information to be supplied to the customer. The customer calls the customer server (action block 501). A dialogue takes place between the customer and the server (action block 503). The server accesses the advertisement processor (AP) (action block 505) and the AP accesses the database and updates the data describing the profile of the customer (action block 507).

Figure 6:
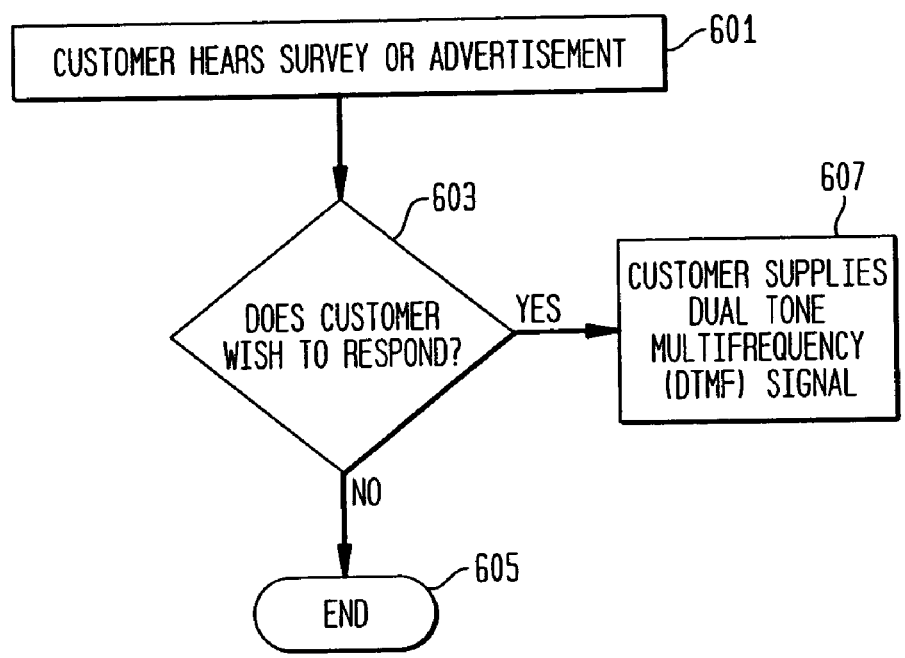
FIG. 6 is a flow diagram illustrating customer response capability.

FIG. 6 illustrates operations for collecting customer feedback. A customer hears a survey or advertisement (action block 601). The customer is asked whether he/she wishes to respond (action block 603). If the customer does not wish to respond then this is the end of the transaction (action block 605). The end may be either the failure by the customer to respond or the customer's responding with, for example, a star symbol.

If the customer wishes to respond then the customer supplies a signal, typically, a dual tone multifrequency (DTMF) signal (action block 607). Information from these signals is passed on by the advertisement processor 10 to the database 20.

Figure 7:
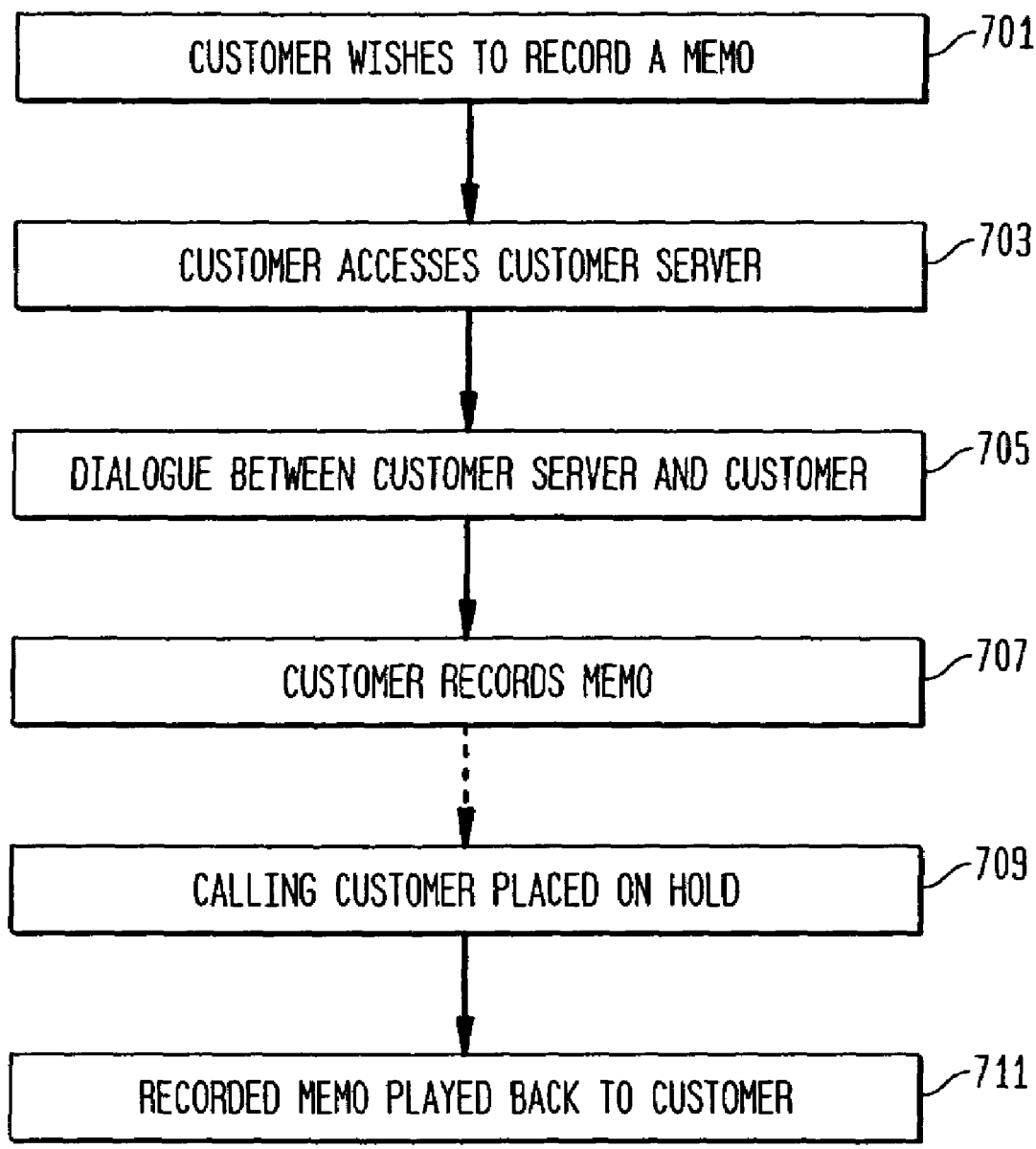
FIG. 7 is a flow diagram illustrating the recording of a memo by a customer.

FIG. 7 illustrates the process of recording a memo from the customer. The customer wishes to record a memo (action block 701). The customer accesses the customer server (action block 703). A dialogue takes place between the customer server and the customer (action block 705). The customer records his/her memo (action block 707) which is stored either in the customer server or in the database. Subsequently, the calling customer (or someone else in the customer's home) is placed on hold (action block 709). The recorded memo is then played back to the calling customer (action block 711).

FIG. 8 illustrates operations for identifying selected data to be accessed during hold intervals. The customer wishes to access selected data during these intervals (action block 801). The customer accesses the customer server (action block 803). A dialogue takes place between the customer server and the customer (action block 805). The customer server stores data for identifying the selected data (action block 807). Subsequently, when the customer uses his/her station the customer server fetches the selected data and causes it to be played to the customer (action block 809).

This arrangement can also be used by customers who do not wish to hear advertising, music, or other information during call on hold intervals. The dialogue with the customer server should allow for this possibility. This dialogue can also be used for requesting a particular kind of music for these intervals.

The above description is of one preferred embodiment of Applicant's invention. Many other embodiments will be apparent to those of ordinary skill in the art without departing from the scope of the invention. For example, the advertisement processor and database may be combined into one unit and/or the advertisement processor may be a part of the switch. The advertisement processor and database may be distributed units wherein different advertisers have separate processors and databases for responding to the switch. The invention is limited only by the attached claims.

I claim:

1. In a telecommunications network, a method of providing an advertising message to a telephone user on hold comprising the steps of:
   at least one advertiser providing data for messages to a database of said telecommunications network;
   in said network, recognizing a hold state of a call connection, wherein said hold state is applied by said telecommunications network, wherein a message can be transmitted to a telecommunications station on hold;
   accessing said database to find a message from said at least one advertiser to be transmitted to said telecommunications station and transmitting the accessed message to said telecommunications station;
wherein said at least one advertiser is not a carrier of said telecommunications network or a party holding said call connection to said telecommunications station or a customer served by said telecommunications station.

2. The method of claim 1 wherein an advertisement processor receives data from said at least one advertiser;
said advertisement processor storing the received data in said database.

3. The method of claim 1 further comprising the steps of:
storing a customer profile for each of a plurality of customers of said telecommunications network; and
selecting said message based on data stored in a customer profile of a customer of said telecommunications station.

4. The method of claim 3 wherein said data comprises a geographic location of said telecommunications station.

5. The method of claim 1 further comprising the step of:
collecting billing data for advertising announcements played to customers.

6. The method of claim 1 wherein said message comprises a logo or company name.

7. The method of claim 1 further comprising the steps of:
recording a memo from a customer of said telecommunications station; and
playing said memo as said message to be transmitted to said telecommunications station.

8. The method of claim 1 further comprising the steps of:
a customer of said telecommunications station providing information identifying data of interest to said customer of said telecommunications station; and
playing the data of interest to said customer as said message.

9. The method of claim 1 further comprising the steps of:
requesting input from said telecommunications station in response to said message; and
collecting inputs from said telecommunications station sent in response to said message.

10. The method of claim 1 wherein said message is a musical passage.

11. The method of claim 10 wherein a customer of said telecommunications station controls a type of music to be supplied in said message.

12. The method of claim 1 further comprising the steps of:
asking a customer of said telecommunications station if he/she wishes to receive more information; and
responsive to receipt of a dual tone multifrequency (DTMF) signal, recording that said customer is to receive additional information.

13. The method of claim 1 wherein messages are sent to caller ID equipment of said telecommunications station.

14. In a telecommunications network, apparatus for providing a message to a telephone user on hold comprising:
a database;
means for permitting at least one advertiser to provide data for messages to said database;
means for recognizing a hold state of a call connection wherein the hold state is applied by the telecommunications network and wherein a message can be transmitted during said hold state to a telecommunications station on hold;
means for accessing said database to find a message from said at least one advertiser to be transmitted to said telecommunications station;
means for transmitting the accessed message to said telecommunications station;
wherein said at least one advertiser is not a carrier of said telecommunications network or a party holding said call connection or a customer served by said telecommunications station.

15. The apparatus of claim 14 further comprising:
an advertisement processor for receiving data from said at least one advertiser;
said advertisement processor for storing the received data in said database.

16. The apparatus of claim 14 further comprising:
means for storing a customer profile for each of a plurality of customers of said telecommunications network; and
means for selecting said message based on data stored in a customer profile of a customer of said telecommunications station.

17. The apparatus of claim 14 further comprising:
means for requesting input from said telecommunications station in response to said message; and
means for collecting inputs from said telecommunications station sent in response to said message.

18. The apparatus of claim 14 wherein said message is a musical passage.

19. The apparatus of claim 14 wherein messages are sent to caller identification equipment of said telecommunications station.

* * * * *